(12) United States Patent
Lakshmi Narasimha et al.

(10) Patent No.: US 11,874,644 B2
(45) Date of Patent: Jan. 16, 2024

(54) POSITION OR VELOCITY CONTROL SYSTEM AND METHOD

(71) Applicant: Texas Instruments Incorporated, Dallas, TX (US)

(72) Inventors: Rajan Lakshmi Narasimha, Dallas, TX (US); David Patrick Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 157 days.

(21) Appl. No.: 17/146,083

(22) Filed: Jan. 11, 2021

(65) Prior Publication Data

US 2021/0132585 A1 May 6, 2021

Related U.S. Application Data

(63) Continuation of application No. 15/841,575, filed on Dec. 14, 2017, now Pat. No. 10,890,895.

(51) Int. Cl.
| | |
|---|---|
| *G05B 19/416* | (2006.01) |
| *G05B 19/29* | (2006.01) |
| *G05B 19/414* | (2006.01) |
| *G05B 19/39* | (2006.01) |
| *G05B 19/25* | (2006.01) |
| *H02K 29/10* | (2006.01) |
| *G02B 26/00* | (2006.01) |

(Continued)

(52) U.S. Cl.
CPC ......... *G05B 19/416* (2013.01); *G02B 26/008* (2013.01); *G05B 19/237* (2013.01); *G05B 19/258* (2013.01); *G05B 19/291* (2013.01); *G05B 19/39* (2013.01); *G05B 19/414* (2013.01); *H02K 29/10* (2013.01); *H02P 6/15* (2016.02); *H02P 6/16* (2013.01); *H02P 6/182* (2013.01); *H02P 27/08* (2013.01); *G05B 2219/41293* (2013.01); *G05B 2219/42237* (2013.01)

(58) Field of Classification Search
CPC .. G02B 26/008; G05B 19/237; G05B 19/258; G05B 19/291; G05B 19/39; G05B 19/414; G05B 19/416; G05B 2219/41293; G05B 2219/42237; H02P 27/08; H02P 6/15; H02P 6/16; H02P 6/182; H02K 29/10

See application file for complete search history.

(56) References Cited

U.S. PATENT DOCUMENTS

| 9,413,282 B2 | 8/2016 | Magee et al. |
| 9,431,945 B2 | 8/2016 | Thomas et al. |

(Continued)

OTHER PUBLICATIONS

"Digital Light Processing"—Wikipedia, downloaded on Jul. 7, 2017 from https://en.wikipedia.org/wiki/Digital_Light_Processing, pp. 1-8 (2017).

(Continued)

*Primary Examiner* — Yuhui R Pan
(74) *Attorney, Agent, or Firm* — John R. Pessetto; Frank D. Cimino

(57) ABSTRACT

In described examples of methods and control systems to control a position and/or velocity of a machine, control circuitry is coupled to receive and dither a control signal, and to compute a control output value according to the dithered control signal and a control function. An inverter is coupled to the control circuitry, to control the position and/or velocity according to the control output value.

18 Claims, 9 Drawing Sheets

(51) Int. Cl.
*H02P 27/08* (2006.01)
*H02P 6/16* (2016.01)
*H02P 6/15* (2016.01)
*H02P 6/182* (2016.01)
*G05B 19/23* (2006.01)

(56) References Cited

U.S. PATENT DOCUMENTS

| | | |
|---|---|---|
| 9,431,947 B2 | 8/2016 | Thomas et al. |
| 9,548,686 B2 | 1/2017 | Magee |
| 9,581,649 B2 | 2/2017 | Narasimha et al. |
| 9,692,336 B2 | 6/2017 | Magee et al. |
| 9,705,437 B2 | 7/2017 | Thomas et al. |
| 9,762,155 B1 | 9/2017 | Magee et al. |
| 2013/0299270 A1* | 11/2013 | Oblizajek .............. B62D 5/046 180/446 |
| 2017/0063269 A1* | 3/2017 | Miklosovic ............ G05B 13/02 |

OTHER PUBLICATIONS

Lipshitz, et al., "Quantization and Dither: A Theoretical Survey", J. Audio Eng. Soc., vol. 40, No. 5, May 1992, pp. 355-375.
Sudhoff et al., "Operational modes of the brushless DC motor with a 120 degree inverter", IEEE Transaction on Energy COnversion, vol. 5, No. 3, Sep. 1992, pp. 558-564.

\* cited by examiner

| STATE | ANGLE RANGE (RAD) | ACTIVE SWITCHES |
|---|---|---|
| S0 | $-\frac{\pi}{6}-\varphi<\theta_e<\frac{\pi}{6}-\varphi$ | T1,T6 |
| S1 | $\frac{\pi}{6}-\varphi<\theta_e<\frac{\pi}{2}-\varphi$ | T1,T2 |
| S2 | $\frac{\pi}{2}-\varphi<\theta_e<\frac{5\pi}{6}-\varphi$ | T2,T3 |
| S3 | $\frac{5\pi}{6}-\varphi<\theta_e<\frac{7\pi}{6}-\varphi$ | T3,T4 |
| S4 | $\frac{7\pi}{6}-\varphi<\theta_e<\frac{9\pi}{6}-\varphi$ | T4,T5 |
| S5 | $\frac{9\pi}{6}-\varphi<\theta_e<\frac{11\pi}{6}-\varphi$ | T5,T6 | ial
POSITION OR VELOCITY CONTROL SYSTEM AND METHOD

CROSS-REFERENCE TO RELATED APPLICATION

This application is a continuation of U.S. patent application Ser. No. 15/841,575 filed Dec. 14, 2017, which is incorporated herein by reference.

BACKGROUND

Control systems are used for controlling machines and processes. Some machine control applications and systems suffer from low resolution feedback and/or low resolution inverter components. For example, a rotating color wheel in a digital light projection (DLP) system may provide a feedback position index signal once per revolution. Also, a low resolution PWM driver circuit may be used to operate a drive motor to rotate the color wheel. Controlling a machine position and/or velocity (speed) is limited in such systems by the resolution of the feedback and/or inverter components. For pulse width modulation control, the resolution limitations can lead to position and/or velocity jitter due to PWM quantization and high frequency harmonic noise. High frequency noise can be reduced by increasing PWM frequency. However, this approach leads to an increase in duty cycle quantization noise. In PWM inverters at higher PWM frequencies, the high duty-cycle quantization error limits the achievable jitter performance.

SUMMARY

In described examples of methods and control systems to control a position and/or velocity of a machine, control circuitry is coupled to receive and dither a control signal, and to compute a control output value according to the dithered control signal and a control function. An inverter is coupled to the control circuitry, to control the position and/or velocity according to the control output value.

DETAILED DESCRIPTION OF EXAMPLE EMBODIMENTS

Figure 1:
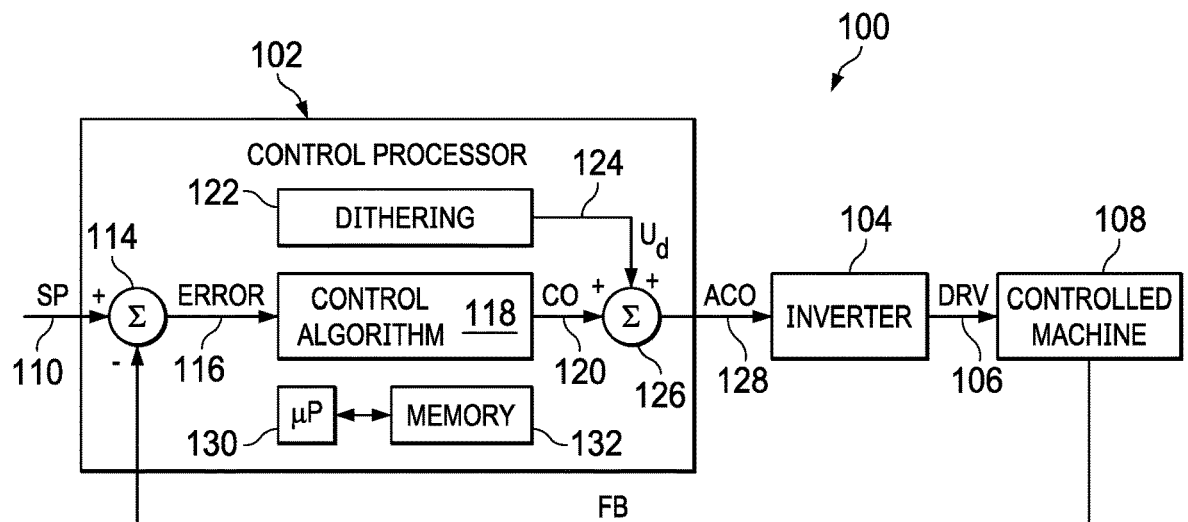
FIG. 1 shows a system diagram of a control system to control a machine position and/or velocity.

In the drawings, like reference numerals refer to like elements throughout, and the various features are not necessarily drawn to scale. FIG. 1 shows a control system 100 to control a position and/or velocity of a controlled machine 108. The system 100 includes: (a) electronic control circuitry, such as embodied within a control processor 102 (e.g., microprocessor); and (b) an inverter 104 with an output 106 to provide an output signal DRV to control the machine 108. The control processor 102 in one example is an integrated circuit (IC) that includes an input 110 to receive a reference or setpoint signal SP, and a second input 112 to receive a feedback signal FB representing a controlled position and/or velocity of the machine 108. In one example, the control processor 102 includes a microprocessor circuit 130 and an electronic memory 132 that stores program instructions. The microprocessor 130 in this example is programmed or otherwise configured to execute program instructions from the memory 132 in order to implement various control functions shown as components 114, 118, 122 and 126 with corresponding signal inputs and outputs. The microprocessor 130 is also configured to compute various values, to receive and convert various input signals, and to generate output signals as described further hereinbelow, including processing and generating analog and/or digital signals. In various examples, the microprocessor dithers a control signal (such as a reference or setpoint signal, a feedback signal, an error signal and/or a control output (e.g., command) signal) and computes a control output value according to (e.g., in response to, or based upon) the dithered control signal and a control function. The control signals can be analog signals (such as voltages, currents, etc.) or digital values. Specific examples are illustrated and described hereinbelow for a dithered control output signal or value, but other implementations are possible in which one or more other control signals (associated with controlling a position and/or velocity of the machine) are dithered. Any dithering technique can be used. Examples of dithering include adding a dithering signal with a uniform distribution or a random distribution to a control signal to generate a dithered signal that is used in controlling a position and/or velocity of a controlled machine. Other examples include multiplying or scaling the control signal by the dithering signal to generate the dithered signal. In some examples, applying the dithering signal through addition or multiplication randomizes quantization error to improve jitter performance.

Figure 2:
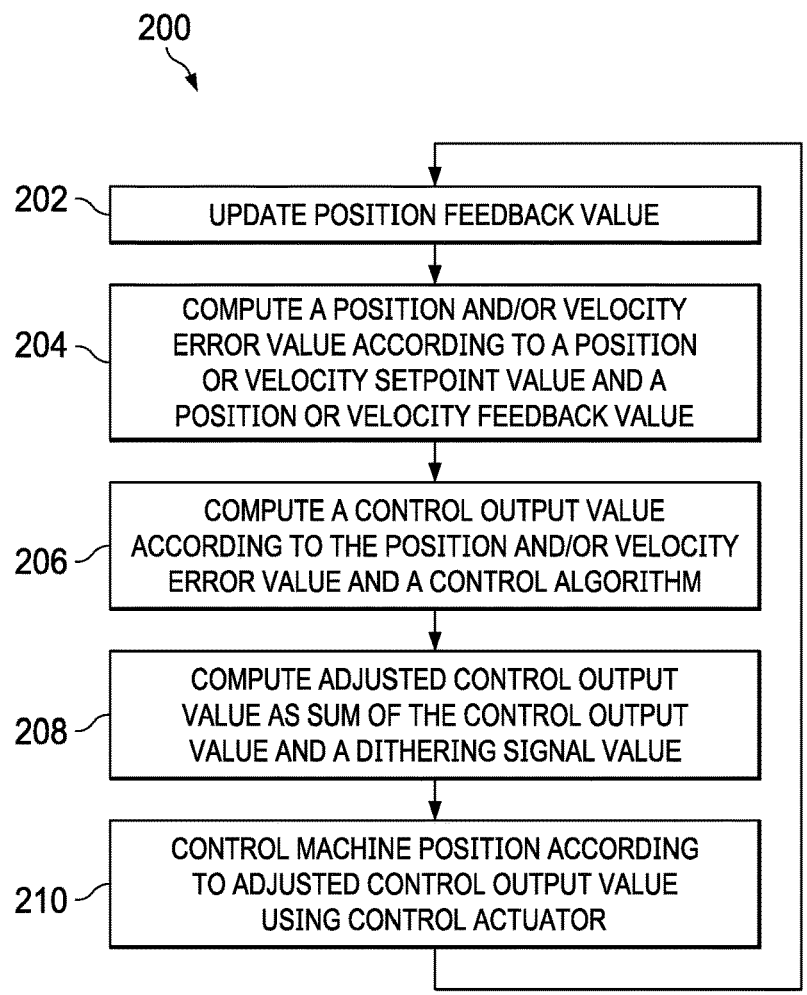
FIG. 2 is a flow diagram of a method of controlling a machine position and/or velocity.

FIG. 2 shows an example method to control a machine position and/or velocity. In one example, the control microprocessor 130 of the control processor 102 executes program instructions from the memory 132 to implement the method 200 of FIG. 2. In FIG. 2, the control processor 102 updates a position feedback value, such as according to (e.g., in response to, or based upon) the received feedback signal FB from a sensor of the controlled machine 108. At 204 in FIG. 2, the microprocessor 130 executes instructions from the memory 132 to compute a position and/or velocity error value ERROR. In one example, the microprocessor 130 executes the program instructions to implement a summation function shown as a summer component 114. The summer component 114 includes a first input 110 to receive a machine position and/or velocity setpoint signal SP representing a desired position and/or velocity of the controlled machine 108, along with a second input 112 to receive a position and/or velocity feedback signal FB that represents an actual measured or estimated position and/or velocity of the machine 108. In this example, the control processor 102 subtracts the feedback signal FB from the setpoint signal SP to compute an error value ERROR, shown as an output signal at a summer output 116.

At 206 in FIG. 2, the control processor 102 computes a parameter CO according to (e.g., in response to, or based upon) the error value ERROR and a control function. The error value ERROR in FIG. 1 is input to a control function or closed loop regulator 118 implemented by the microprocessor 130. The control processor 102 can implement any suitable control function 118. At 208 in FIG. 2, the control processor 102 computes a control output value ACO as a sum of the parameter CO and a dithering signal value $U_d$. In one example, the microprocessor 130 executes program instructions from the memory 132 to implement a summation component or function 126. The summer 126 adds the control output value CO from an output 120 of the control function 118 with a dithering signal value $U_d$ from an output 124 of a dithering component 122. In at least one example, the control processor 102 includes an output 128 that provides the control output value ACO from the summer 126 to the inverter 104. In on example, the inverter 104 is an integrated circuit with an input that receives the control output value ACO from the output 128 of the control processor 102. The inverter 104 includes an output 106 that provides one or more drive signals DRV to control a position and/or velocity of the machine 108 according to (e.g., in response to, or based upon) the control output value ACO (210 in FIG. 2).

The control system 100 and the method 200 can be advantageously employed to mitigate or eliminate unwanted jitter in controlling position and/or velocity of the controlled machine 108. For example, the dithering component 122 selectively adjusts the parameter CO by summation with the dithering signal value $U_d$. The dithering value $U_d$ can be any suitable dithering function, including random dithering, and the dithering signal value $U_d$ can have positive and/or negative values. The resulting control output value (e.g., signal) ACO enhances control resolution to address jitter and high-frequency noise problems in closed loop systems having low resolution feedback elements and/or low resolution inverters.

Figure 3:
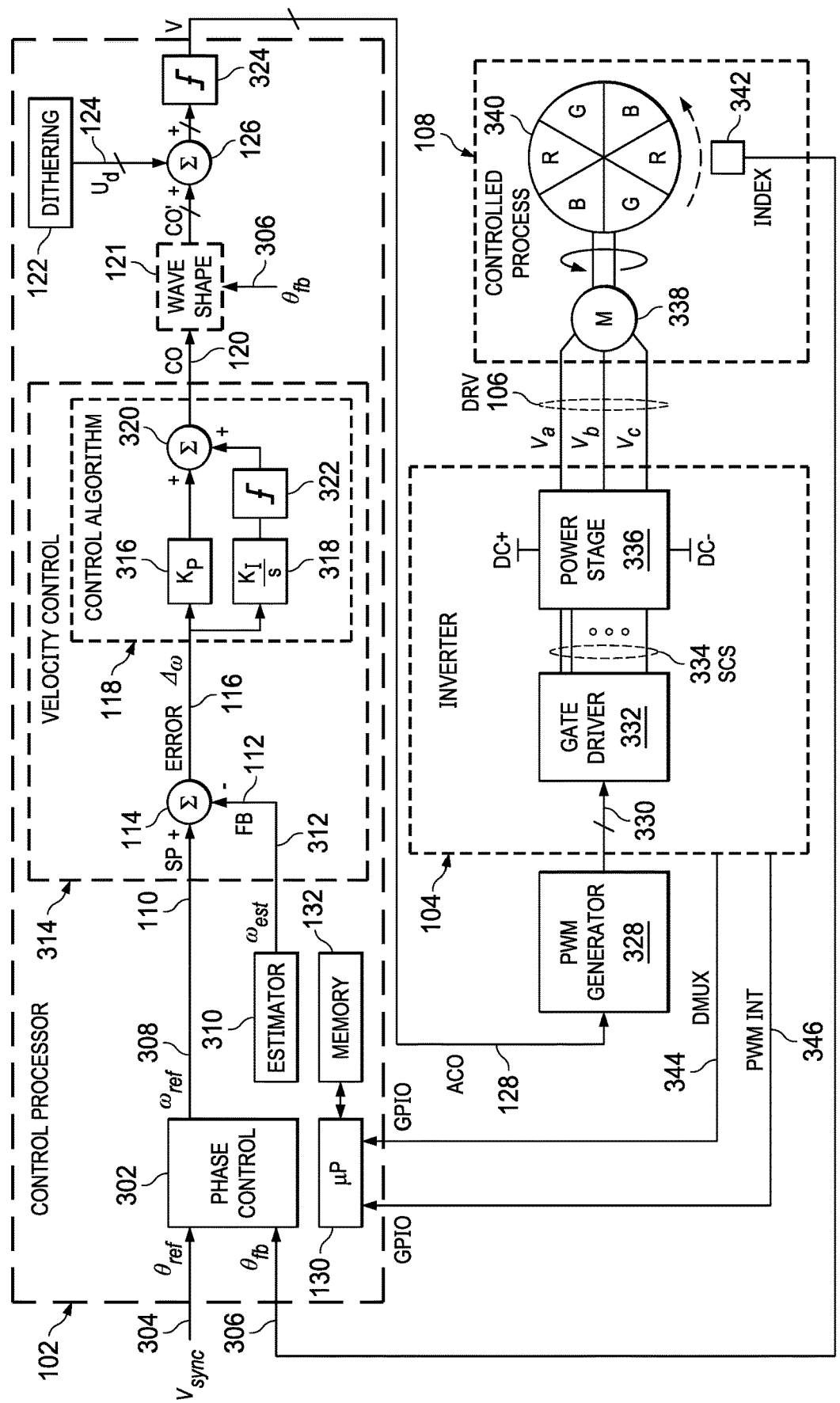
FIG. 3 is a system diagram of a control system to control a motor position and/or velocity.
Figure 4:
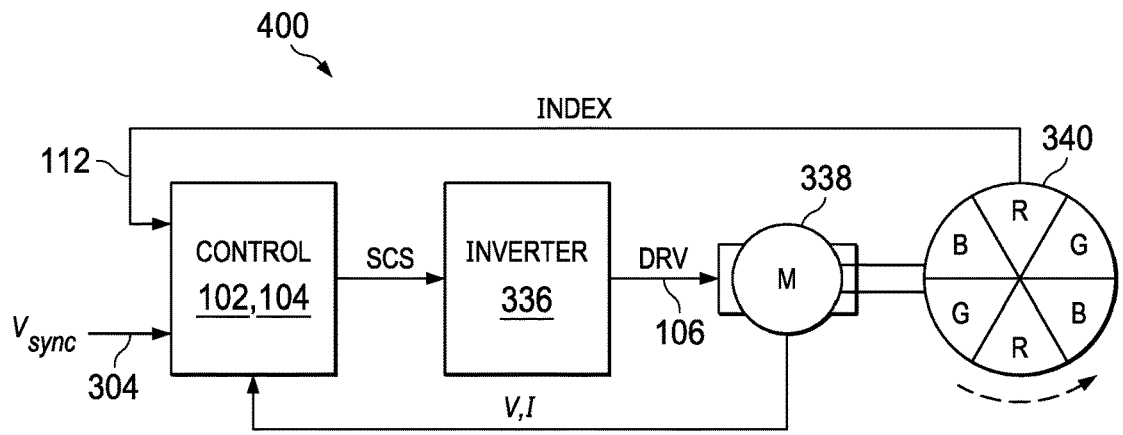
FIG. 4 is a simplified block diagram of a digital light projection system with a color wheel rotated by a motor.

FIG. 3 shows application of the control system 100 to control the angular position θ and/or rotational velocity ω of a color wheel 340 rotated by a drive motor 338 in a digital light projection system. In this example, the controlled process 108 includes the motor 338 and the rotating color wheel 340, with a feedback position sensor 342 that detects a mark on the color wheel 340 once per revolution and generates a corresponding rotor angle position feedback pulse signal INDEX to an angle feedback input 306 of the control processor 102.

In this example, the control processor 102 also includes a set point input 304 that receives a rotor angle reference or setpoint signal Vsync. The control processor 102 implements an outer motor position control loop to control the rotor angle represented by a motor position feedback signal or motor position $\theta_{fb}$ according to (e.g., in response to, or based upon) the INDEX signal from the feedback sensor 342. The control processor 102 in this example implements a phase control component 302 with inputs 304 and 306 to receive the reference pulse signal $V_{sync}$ and the motor position $\theta_{fb}$. In this example, the microprocessor 130 executes instructions from the memory 132 in order to implement computations associated with the phase control component 302 to regulate the outer motor position control loop to control the motor position $\theta_{fb}$ according to the setpoint or reference angle $\theta_{ref}$ represented by the reference pulse signal $V_{sync}$. The phase control component 302 includes an output 308 that generates a motor velocity reference or setpoint value $\omega_{ref}$ that represents a desired motor velocity to achieve the desired setpoint phase angle value $\theta_{ref}$.

The control processor 102 in this example also implements an inner motor velocity control loop. The microprocessor 130 executes instructions from the memory 132 to implement computations associated with a velocity control component 314 shown in FIG. 3. The velocity control component 314 computes a motor velocity error value Δω according to the motor velocity setpoint value $\omega_{ref}$ and a motor velocity value $\omega_{est}$. The microprocessor 130 in this example implements an estimator component 310 with an output 312 that provides the rotor rotation velocity value $\omega_{est}$. In one example, the estimator component 310 computes the value $\omega_{est}$ using phase voltage information from the inverter 104 or timing information from the phase angle feedback signal INDEX. In other examples, the microprocessor 130 can obtain a motor velocity value from a speed sensor (not shown) operatively associated with the motor 338. In the example of FIG. 3, the microprocessor 130 implements the summer 114 to compute the motor velocity error value Δω as the difference between the motor velocity setpoint value $\omega_{ref}$ and the motor velocity value $\omega_{est}$ (e.g., $\Delta\omega=\omega_{ref}-\omega_{est}$). The motor velocity value $\omega_{est}$ is provided at the input 112 to the summer 114 for use as the control loop feedback value FB. The summer 114 subtracts the motor velocity value from the velocity setpoint value $\omega_{ref}$ (SP) at the summer input 110. The summer 114 generates the velocity error value Δω (ERROR) at the summer output 116.

The velocity control component 314 computes the parameter CO according to (e.g., in response to, or based upon) the motor velocity error value Δω (ERROR) and a proportional-integral (PI) control function 118. The example PI control function 118 multiplies the velocity error value Δω by a proportional gain factor 316 ($K_P$) and provides the result to a summer component 320. The function 118 also multiplies the velocity error value Δω by an integral gain 318 (K/s). A limiter component 322 receives the result of the integral gain scaling from the component 318 and sets minimum and maximum values. The limiter component 322 provides its output to the summer 320, and the summer provides the parameter CO at the output 120.

In some examples, the parameter CO is provided directly to the summer 126. The example of FIG. 3 includes an optional wave shaping component 121, with a first input to receive the parameter CO from the output 120, and a second input 306 that receives the motor position feedback signal $\theta_{fb}$. The control processor 102 adjusts the parameter CO to generate an adjusted parameter CO' according to (e.g., in response to, or based upon) a position dependent waveform shaping function ƒ(θ), and provides the adjusted parameter CO' to the input of the summer 126. The summer 126 computes the control output value ACO as a sum of the adjusted parameter CO' and the dithering signal value $U_d$. In one example, a limiter component 324 is included at the output of the summer 126. The limiter component 324 sets minimum and maximum values of the control output value ACO. The output 128 of the limiter 324 provides the control output value (e.g., signal) ACO to the PWM generator 328. In one example, the control output value ACO represents a voltage command V. In another example, the control output value CO represents a current command. For a trapezoidal drive with no wave shaping component 121, the control output value ACO is a single duty cycle scalar value. In examples using the wave shaping component 121, the control output value ACO can be a vector with more than one duty cycle value corresponding to the different half bridges of the power stage 336, as described hereinbelow with respect to equations (5) and (6), which show two dithered duty cycle values. Similarly, the dithering signal value $U_d$ from the dithering component output 124 and the adjusted parameter CO' can be vectors in some examples. In the example of FIG. 3, moreover, where wave shaping is used, the output of the summer 126 provides a vector signal to the limiter 324. In this example, the limiter 324 provides a vector signal designated V in FIG. 3 (the control output value ACO) to the PWM generator 328, and the output 330 of the PWM generator 328 provides a vector signal to the gate driver circuit 332.

The inverter 104 includes the power stage 336 that generates an AC output signal $V_a$, $V_b$, $V_c$ according to one or more switching control signals SCS from the gate driver circuit 332 to control the position θ and/or velocity ω of the motor 108. The power stage 336 operates according to first and second DC bus voltages DC+ and DC−, and includes switches (such as MOSFETs, IGBTs, etc., not shown) operating according to the switching control signal or signals SC to selectively connect individual motor phase lines 106 of the DC bus lines DC+, DC−. In one example, the switching control signals SCS are pulse width modulated (PWM) signals with a controlled on-time for duty cycle to operate the power stage switches. In this example, the inverter output 106 generates three phase voltage signals to drive a motor 338 in order to rotate the color will 340 according to the switching control signals SCS.

The inverter 104 also includes a motor gate driver 332 that receives the control output ACO from the control processor 102, and provides the switching control signals SCS to the power stage 336. The gate driver circuit 332 receives a pulse width modulated signal from an output 330 of a PWM generator circuit 328. The PWM generator circuit 328 provides the pulse width modulated signal with a pulse width set by the control output value ACO. The gate driver circuit 332 includes any suitable analog circuitry with amplifiers, level shifters and drive transistors suitable for providing one or more switching control signals SCS at suitable levels to actuate the switches of the power stage 336. In one example, the driver circuit 332 includes 6 outputs 334 that provide a set of six switching control signals SCS to operate six switches of the power stage 336 in a duty cycle or pulse width according to (e.g., in response to, or based upon) the control output value ACO.

In one example, the inverter 104 communicates with the control processor 102 by a serial peripheral interface (SPI) serial communications interface. The SPI transfers the control output value ACO to the PWM generator circuit 328 of the inverter 104. The SPI interface in this example also transfers various data values from the inverter 104 to the control processor 102. In the illustrated example, the inverter 104 also includes digital outputs 344 and 346 connected to general purpose I/O (GPIO) inputs of the control processor 102 to generate interrupts to the microprocessor 130. In the illustrated example, the inverter 104 monitors the motor phase voltage output signals $V_a$, $V_b$, $V_c$ and includes circuitry (not shown) to identify zero crossings in the voltage waveforms. The inverter 104 generates a signal DMUX as a pulse indicating zero crossings of the back EMF of the motor 338 according to the phase voltage zero crossings. Also, the inverter 104 in the example of FIG. 3 generates a PWM interrupts signal PWM INT at the output 346, in order to interrupt the microprocessor 130 at the beginning of each PWM switching cycle.

Referring also to FIGS. 3-6, FIG. 4 shows a digital light projection system 400 with a color wheel 340 rotated by a motor 338. The motor 338 is driven by a power stage 336 according to driver signals DRV. The power stage 336 operates according to one or more switching control signals SCS from a control circuit 102 and 104 as described hereinabove. The control circuitry 102 and 104 controls the position and/or velocity of the motor 338 and of the driven color wheel 340 according to the reference pulse signal $V_{sync}$ and a feedback value on the line 112, and the motor 338 generates and outputs voltage (V) and/or current (I) signals to the control circuit 102 and 104. PWM quantization and high frequency harmonic noise limit the position and/or velocity control achievable in the system 400, particularly where position and/or velocity jitter is an important performance metric. Moreover, resolution limitations of feedback signaling and/or the inverter exacerbate these problems. High frequency noise can be reduced by increasing PWM frequency, but this approach leads to an increase in duty cycle quantization noise. The high duty-cycle quantization error in PWM inverters at higher PWM frequencies generally limits the achievable jitter performance. Jitter can be improved by increasing the resolution (number of operating bits) of the feedback system and/or of the PWM control signal, but this generally increases system cost.

The control systems and methods of FIGS. 1-3 provide a low cost solution to improve jitter performance, while continuing to use low resolution feedback components and/or low resolution inverter circuitry. In some examples, the duty cycle resolution of the power stage 336 is effectively increased or updated through functions at sampling frequency higher than the speed feedback rate, instead of through hardware redesign or the use of high resolution sensors. For example, the dithering signal value $U_d$ modifies the phase lock loop operation and generating the control output value ACO. This technique facilitates the use of existing low resolution driver chips 104 to drive the color wheel 340, without hardware redesign for new high performance applications. Accordingly, the color wheel rotation control application for digital light projection (DLP) applications is an example. Described methods and control systems are useful in any type of position and/or velocity control application. For example, the systems 100 and methods 200 are useful to modify the phase control output at a given PWM switching frequency in motor control applications to achieve lower quantization error. The color wheel rotation application 400 and FIG. 4 can be improved using the filtered control aspects of the system 100 and the method 200 to synchronize the motor 338 to an input reference pulse train of the reference pulse signal $V_{sync}$ that provides motor position feedback at a relatively slow rate of once per mechanical revolution. In this digital light projection application, the color wheel 340 filters white light from a lamp (not shown) and the filtered light components fall on a micro-mirror array chip which projects light on to a screen (not shown). The DLP color wheel 340 provides an optical index signal (INDEX in FIG. 3) that gives position feedback once per mechanical revolution. The desired control is to regulate the motor speed and position, such that the INDEX signal is phase lock to a reference pulse train of the reference pulse signal $V_{sync}$ (e.g., 60 Hz in one implementation) to synchronize projected video frames.

Described examples include a control system 100 and methods for controlling a position and/or velocity of a machine 108. A control processor 102 computes a parameter CO according to (e.g., in response to, or based upon) a position and/or velocity error value ERROR and a control function (e.g., algorithm) 118. The control processor 102 computes a control output value ACO as a sum of the parameter CO and a dithering signal value $U_d$. A, and an inverter 104 controls a position θ or velocity ω of the machine 108 according to the control output value ACO.

Figure 5:
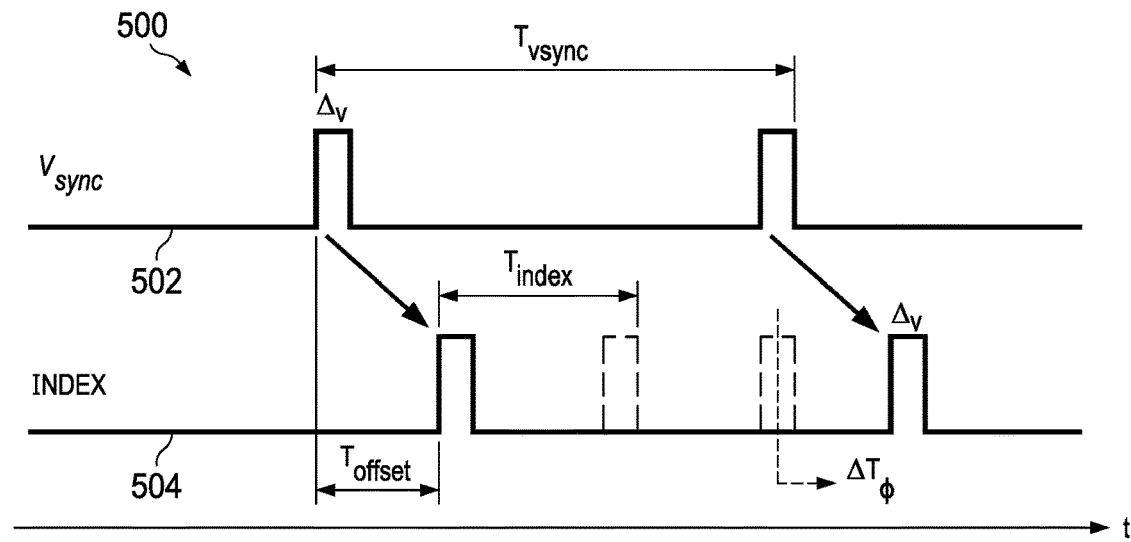
FIG. 5 is a graph of a phase reference signal and a mechanical feedback index signal in the digital light projection system of FIG. 4.

FIG. 5 shows a graph 500 that includes a curve 502 which shows the phase reference signal $V_{sync}$. A curve 504 shows the mechanical feedback INDEX signal. The system tracking performance is characterized as the jitter, which is the time difference between the $V_{sync}$ and INDEX pulses, shown as the offset time $T_{offset}$ in FIG. 5. One control performance goal is to control the motor 338 such that the color wheel 340 can reliably rotate in a controlled fashion with stable jitter performance for a wide range of color wheel inertias (e.g., 10-240 g*cm$^2$) at a wide range of speeds (e.g., the 90-240 Hz) and desired tracking performance (e.g., 5 us jitter). The control systems 100 and the method 200 achieve good phase tracking performance despite the constraints on bandwidth imposed by the low sample rate feedback mechanism. Also, described methods and control systems facilitate operation at higher PWM frequencies that would otherwise result in lower duty cycle resolution. Moreover, described examples provide low complexity and low cost solutions, without requiring hardware redesign or more expensive feedback components. Further, described examples are useful for motor position and/or velocity control of motors with trapezoidal, sinusoidal and other back-EMF waveforms. Described examples further allow optional use of waveform shaping components (e.g., 121 in FIG. 3 hereinabove) in combination with dithering components 122, 126, in order to achieve high resolution position and/or feedback control with improved jitter performance, even in use with low resolution inverters and/or low resolution feedback components.

Figure 6:
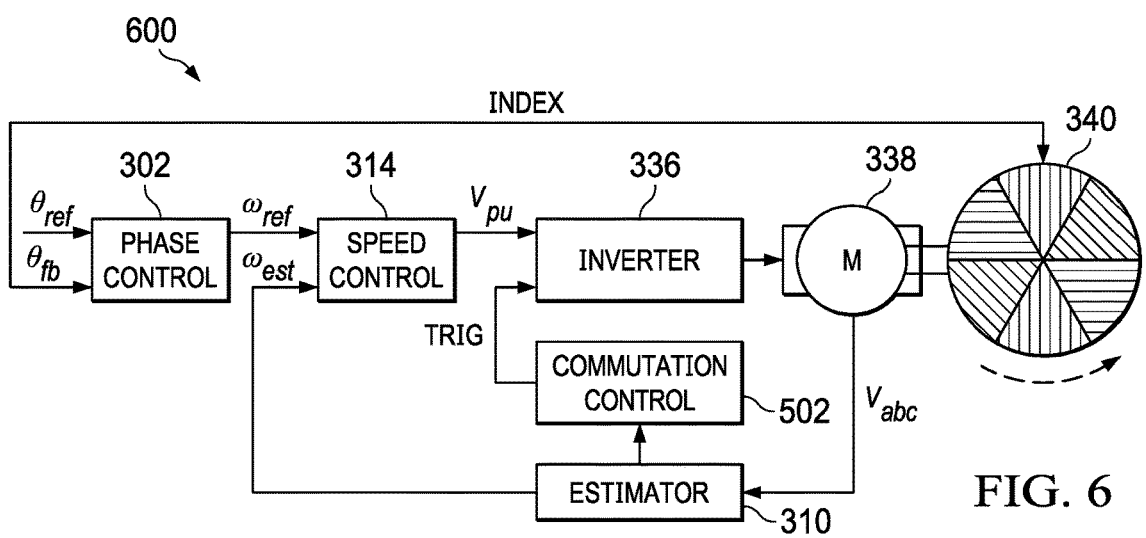
FIG. 6 is a simplified block diagram of a cascaded control configuration with phase and speed loops.

FIG. 6 shows a cascaded control configuration with phase and speed loops to control the rotation of the color wheel 340 using the motor 338. As shown in FIGS. 3 and 6, the control configuration includes a phase control component 302 implementing an outer angular position control loop, and a speed control component 314 implementing an inner velocity (e.g., speed) control loop to provide synchronized motor phase control for DLP systems or other applications. Described examples are useful in a variety of different control architectures, such as current control, phase control, speed control, cascaded phase and speed control, etc. The architecture in FIG. 6 includes a commutation control component 502 that provides a trigger signal "trig" to the power stage 336 based on an output of the velocity estimator component 310. The commutation loop provides a rotating stator field vector by sensing the rotor position from the estimator 310 and controlling the switching of the inverter phases at the appropriate time. The speed and phase loops control the duty cycle of the switching control signals that drive inverter switches to regulate the effective voltage appearing at the motor load. This control configuration provides for accelerating or decelerating the motor 338 in accordance with the speed and phase errors in closed loop fashion. The commutation loop creates a rotating stator field vector that leads the magnetic field generated by the rotor magnetics to create a positive torque to counter the load torque. The system can be a sensorless speed control loop, in which the motor speed is estimated by the estimator component 310 without a direct sensor signal.

Figure 7:
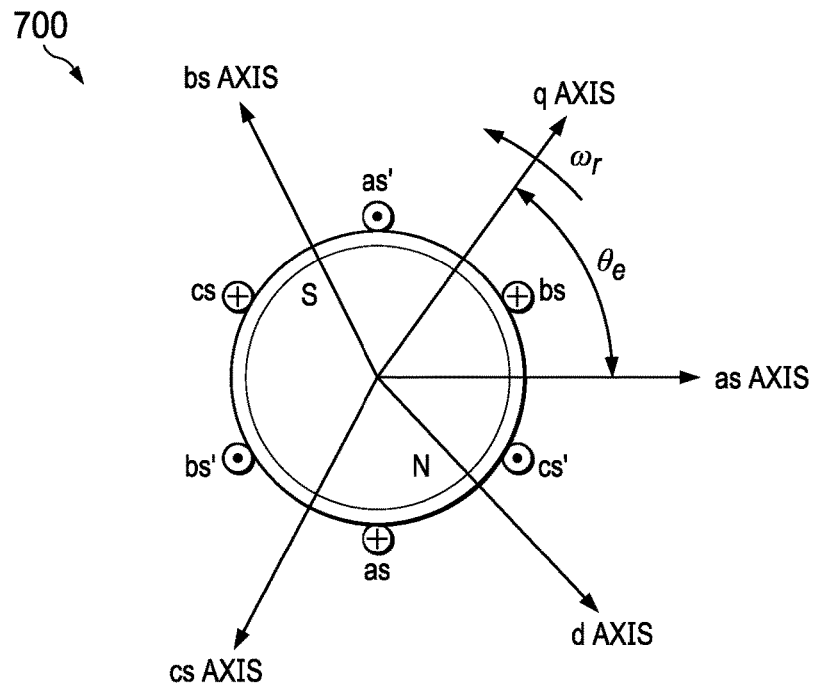
FIG. 7 is a simplified motor phase winding diagram.
Figure 8:
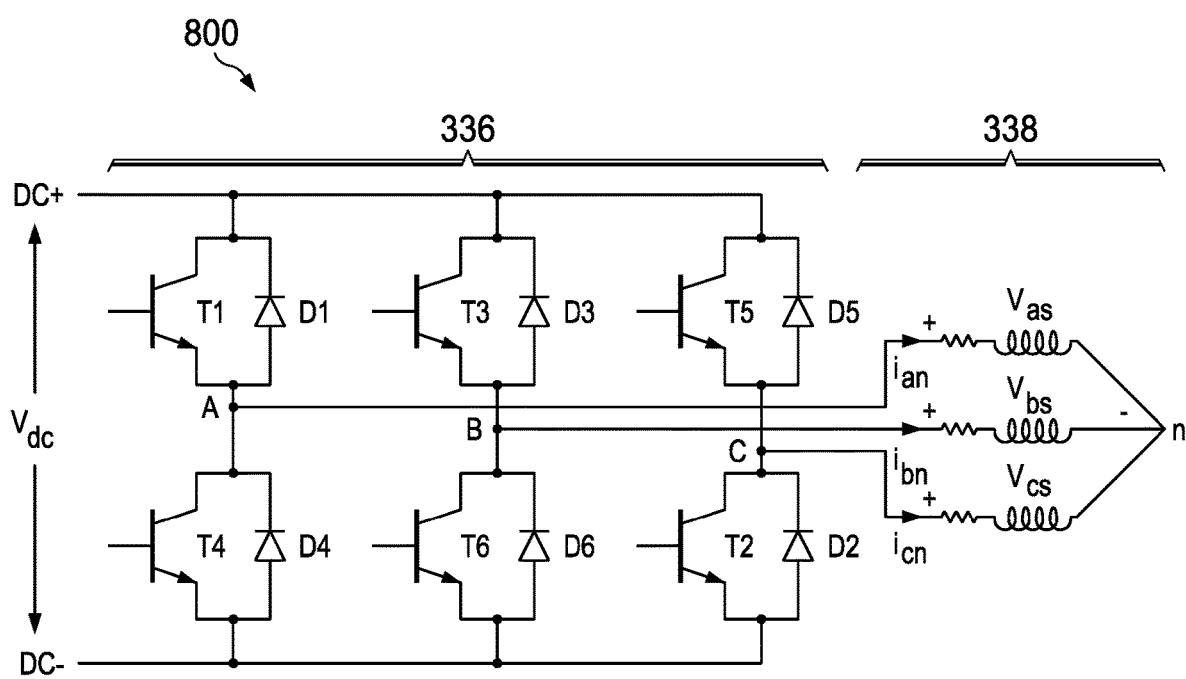
FIG. 8 is a simplified schematic of a multiphase power stage driving a motor.
Figure 9:
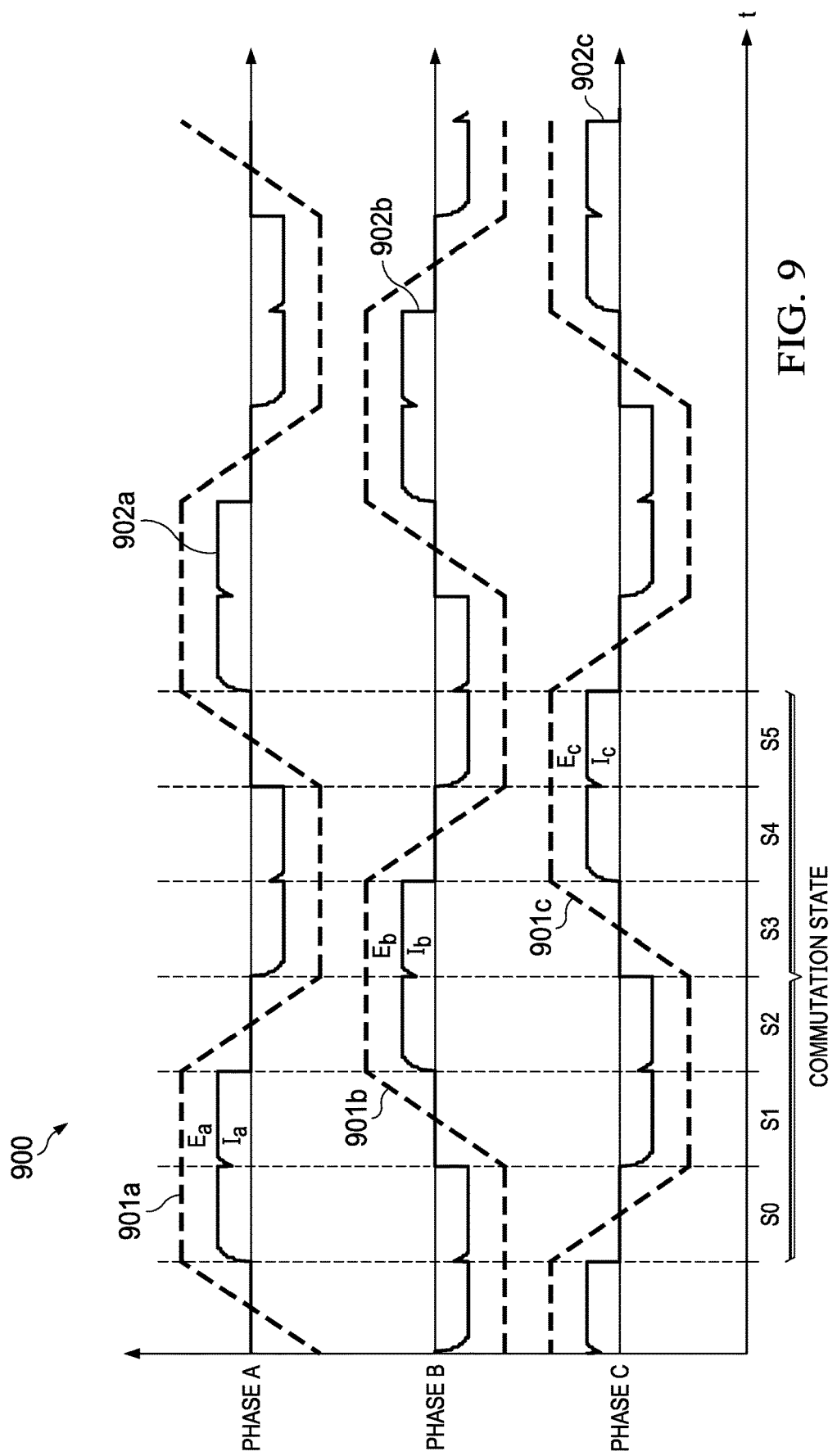
FIG. 9 is a graph of commutation states and back-EMF signals for the motor of FIG. 8.
Figures 10, 11:
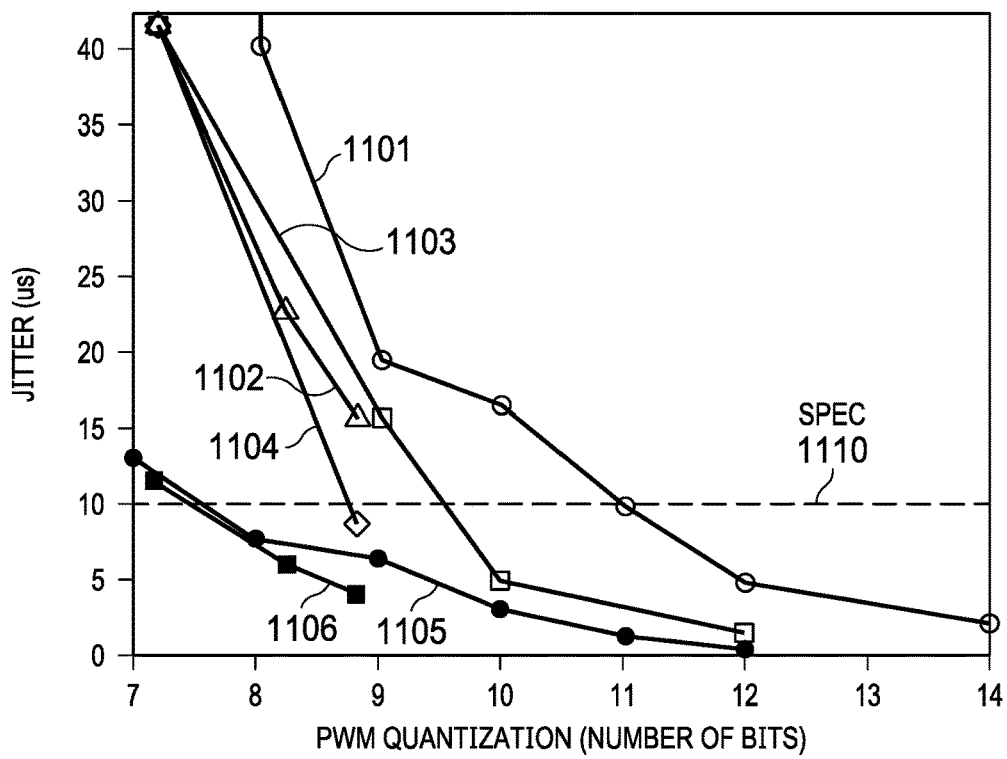
FIG. 10 is a commutation state table for the control configuration of FIG. 6.
FIG. 11 is a graph of angle jitter versus duty cycle resolution for a first range of operating speeds.

Referring also to FIGS. 7-10, FIG. 7 shows a motor phase winding diagram 700. The diagram 700 in FIG. 7 shows a cross-section of the motor phase winding axes and the interconnections between the three-phase power stage 336 and the motor terminals. FIG. 8 shows a schematic representation 800 of an example 3 power stage 336 with transistor switches T1-T6 and corresponding flyback diodes D1-D6 driven by a DC bus voltage $V_{dc}$. FIG. 8 also shows a three phase motor 338 and the corresponding winding resistances and inductances connected in a "Y" configuration with a neutral "n". In FIG. 8, the motor windings conduct corresponding phase currents Ian, Ibn and Icn, and have corresponding line-neutral voltages Van, Vbn and Vcn. FIG. 9 shows a graph 900 with curves 901a, 901b and 901c representing the back-EMF signals for motor phases A, B and C during operation in the example commutation states S0-S5 for the motor 338 of FIGS. 7 and 8. The graph 900 also includes phase current curves 902a, 902b and 902c during motor operation. Also, FIG. 10 shows a commutation state table 1000 with switching states S0, S1, S2, S3, S4 and S5. In one example, the control configuration of FIG. 6 uses the switching states S0-S5 of FIG. 10. The motor operation in one example is divided into six sequential states, S0 to S5. For example, during state S0, the switches T1 and T6 are turned on to cause current flow from the supply via T1 to motor phase A and B and back to ground via T6, as shown in FIG. 8, while the current in the third half bridge is driven to zero (transistors T5 and T2 are turned off). The back-EMF signals shown by curves 901a, 901b and 901c in FIG. 9 are divided into sections corresponding to the six states of a given electrical cycle. The control system 100 transitions between states in response to detected back-EMF zero crossings indicated by the DMUX signal in FIG. 3. In this example, the transition or commutation from state S0 to S1 occurs at a phase advance angle of φ=π/6 radians past the zero crossing of phase C.

The table 1000 in FIG. 10 summarizes an example set of commutation states showing the active transistors as a function of rotor angle range for each state and the active switches. The inverter 104 in one example computes the rotor electrical angle ($θ_e$) to control the state transition instants according to the sensed phase voltage signals $V_a$, $V_b$ and $V_c$ by computing the corresponding back-EMF signals $E_a$, $E_b$ and $E_c$ (curves 901a, 901b and 901c in FIG. 9). The inverter 104 uses the zero crossings of the back-EMF signals 901 to estimate the rotor position $θ_e$, which corresponds to the angular position of the color wheel 340. FIG. 9 shows six back-EMF zero crossings per electrical rotation, which is one zero crossing per state, in this example. In each state, two half bridges of the three-phase inverter are active and the third is left open, i.e., the corresponding gate inputs are held low. For example, in state S0, the gate input of T6 is held high (T3 held low) and the gate inputs of T1 and T4 are driven by complementary duty cycle pulses. The gate inputs of T2 and T5 are held low to drive the current in that branch to zero.

The control processor 102 implements the speed (velocity) and phase (position) loops to compute the duty cycle and provides the dithered control output value ACO to the inverter 104 to implement the closed loop duty cycle control. In one example, the speed and phase loops compute the ideal voltage (V) to be applied to the motor for speed and phase regulation to synchronize the rotor position with the reference setpoint signal Vsync. The speed control computes the velocity error value Δω based on the estimated rotor velocity value $\omega_{est}$ and the control processor 102 implements PI control to compute the parameter CO representing voltage as a function of the velocity error Δω. The phase control loop is activated when the motor velocity ω is within a threshold of the target velocity setpoint $\omega_{ref}$. The phase loop (component 302 in FIG. 3) estimates the difference in phase between the reference value Vsync and the phase feedback ($\theta_{fb}$) value, and computes the velocity setpoint $\omega_{ref}$ as a function of phase error. The dithering component 122 addresses quantization of the desired control voltage signal (V) and its impact on tracking performance to reduce jitter. The duty cycle resolution determines the smallest applicable voltage correction value V to correct for speed or phase error that impacts jitter performance. In the example PWM-based architecture, the duty cycle resolution in effective number of bits ($N_b$) is given by the following equation (1) where $F_{clk}$ and $F_{pwn}$ represent the clock and PWM frequencies, respectively:

$$N_b = \log_2(F_{clk}/F_{pwn}) \quad (1)$$

In addition to duty cycle quantization effects, the PWM waveform may include high frequency harmonics that appear as noise across the motor terminals. As the PWM frequency increases, the effect of high frequency PWM harmonics on speed decreases, but the duty cycle resolution degrades according to equation (1). Voltage quantization errors can contribute to the error in velocity Δω. The velocity controller 314 computes the parameter CO to correct for the velocity error Δω. The desired voltage output value V is quantized, leading to a cyclic behavior within the bandwidth of the controller 102. The following equation (2) computes the smallest voltage that can be applied by the controller 102:

$$\delta V = V_{dc}/(2^{N_b}-1) \quad (2)$$

Figure 12:
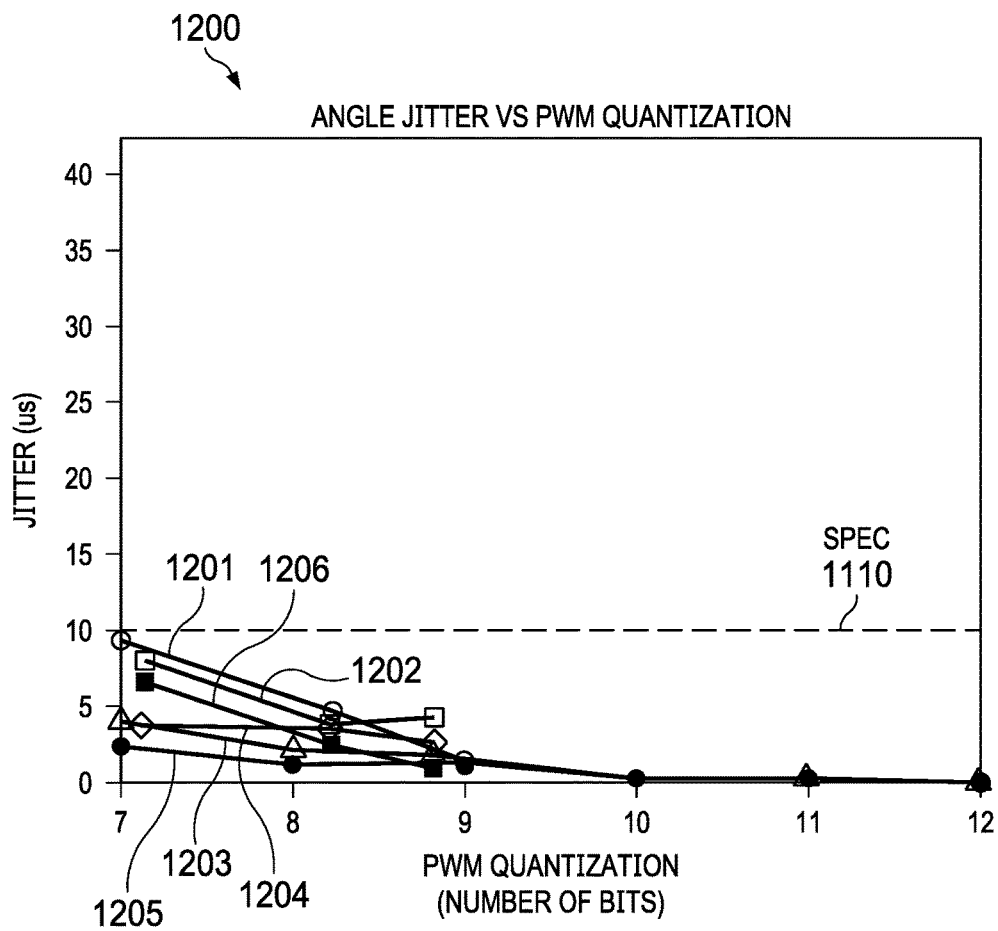
FIG. 12 is a graph of angle jitter versus duty cycle resolution for a second range of operating speeds.

FIGS. 11 and 12 show baseline simulation and lab testing results for a digital light projection system operating without dithering. FIG. 11 shows a graph 1100 of angle jitter versus duty cycle resolution (number of PWM quantization bits $N_b$ which is the effective number of bits used to represent the PWM duty cycle) for a first range of operating speeds. The curve 1101 in FIG. 11 shows angle jitter as a function of duty cycle resolution for a simulation at a rotational velocity of 60 Hz, and the curve 1102 shows lab testing results in a rotational velocity of 60 Hz. Curves 1103 and 1104 respectively show simulation and lab testing results for a rotational velocity of 90 Hz. The curves 1105 and 1106 respectively show simulation and lab testing results for a rotational velocity of 120 Hz. FIG. 12 shows a graph 1200 of angle jitter versus duty cycle resolution for a second range of operating speeds. The graph 1200 includes curves 1201 and 1202 that respectively show simulation and lab testing results for a rotational velocity of 150 Hz. Curves 1203 and 1204 respectively show simulation and lab testing results for a rotational velocity of 180 Hz. The curves 1205 and 1206 respectively show simulation and lab testing results for a rotational velocity of 240 Hz. The graphs 1100 and 1200 also illustrate an example jitter specification (SPEC) 1110. The graphs 1100 and 1200 illustrate the jitter performance at different operating motor speeds without dithering, where low-speed operation suffers from higher jitter, particularly for lower PWM quantization duty cycle resolution. The duty cycle resolution constraints imposed by limited duty cycle resolution for the inverter 104 and/or the feedback system leads to inability to meet the illustrated specification 1110, particularly for low-speed operation.

As shown in FIGS. 11 and 12, the measured jitter decreases with increase in $N_b$ and increase in mechanical speed $f_m$. The marginal improvement in jitter with PWM quantization diminishes with mechanical speed. At approximately 9 bits of duty cycle resolution, the jitter specification 1110 can be met for a color wheel 340 with an inertia J=24 g*$cm^2$ wheel at mechanical speeds 120 Hz and above. At 90 Hz, a PWM resolution of 11-12 bits is required to meet the jitter specification for this example. To meet the specification at 60 Hz, a resolution of 12-13 bits is necessary. A higher control update rate can compensate for a lack of PWM resolution. Described examples achieve sufficient jitter performance in systems with limited resolution components (e.g., feedback components and/or inverters), even for low operating speeds. This solution avoids the need to redesign hardware systems to meet lowered jitter acceptance limits and to meet the performance specifications at lower operating speeds, such as by implementing an algorithmic approach that operates within the constraints imposed by the existing system architecture to achieve the desired tracking performance.

Figure 13:
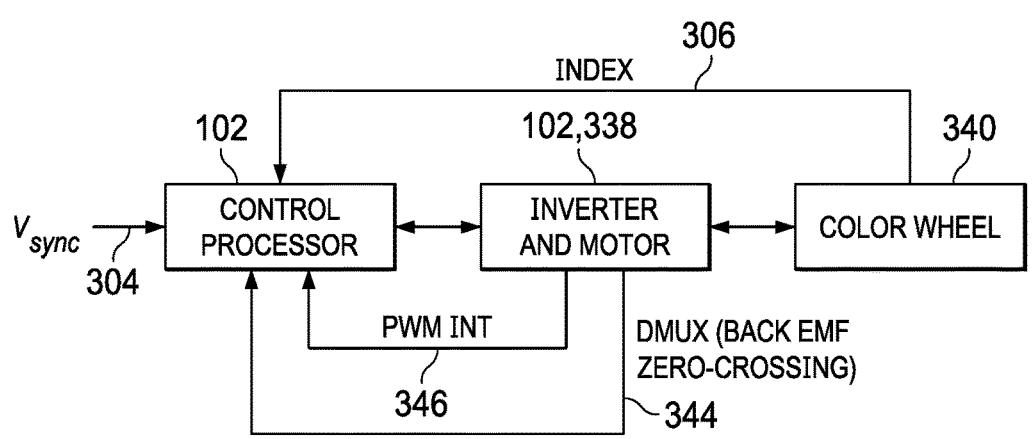
FIG. 13 is a simplified block diagram of a circuit implementation of a digital light projection system of FIG. 3.

FIG. 13 shows a simplified example circuit implementation of a digital light projection system of FIG. 3. In this example, the inverter 104 is implemented as a PWM motor driver IC with a serial peripheral interface (SPI) communications connection with the control processor 102. The inverter 104 also operates the signal outputs 344 and 346 that respectively provide the DMUX and PWM INT signals to the control processor 102. A control motor rotates the color wheel 340 as described hereinabove. Position sensor apparatus (not shown) provides the INDEX feedback signal to the control processor 102 via the output 306. As shown in FIGS. 11 and 12, the duty cycle resolution limitations of some driver and/or feedback components may be insufficient to achieve tight jitter specifications at 60 and 90 Hz. The INDEX signal triggers an interrupt service routine in the control processor 102, which executes phase and speed estimation and control loop components 302 and 314. In one example, a DSP or other processing circuit (not shown) in the motor gate driver 332 reads a duty cycle command register (KVAL) at the beginning of each PWM period. The control processor 102 in this example loads the control output value ACO into the duty cycle command register (KVAL) based on the closed loop control components 302 and 314, the dithering component 122 and any included waveform shaping 121. The motor gate driver 332 computes the number of clock ($F_{clk}$ clock) cycles of the PWM pulse width during which the active transistor or transistors are driven (turned on), according to the value of the KVAL register. For example, in the state S0, the value of KVAL determines the PWM duty cycle driving the inverter transistor T1.

Figure 14:
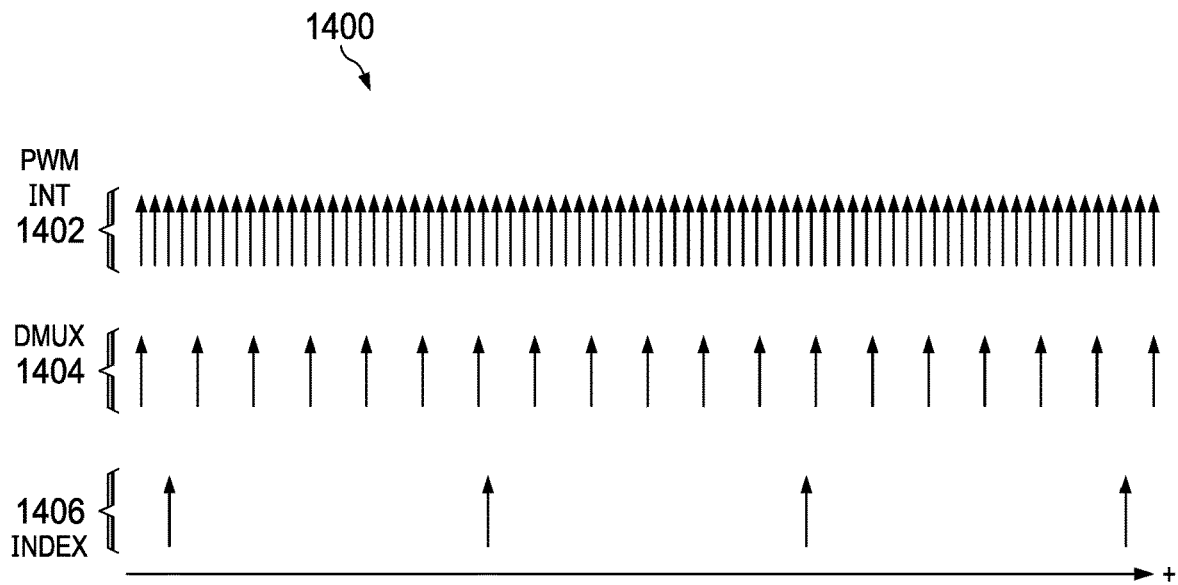
FIG. 14 is a graph of interrupt timing signals in the control system of FIG. 3.

Referring also to FIG. 14, the system 100 and the method 200 advantageously employ dithering via the components 122 and 126 to improve the jitter performance at lower speeds in the DLP color wheel rotation system of FIG. 3.

Described embodiments can be employed in any general closed-loop control application, in which a machine position and/or velocity are controlled. A graph 1400 in FIG. 14 illustrates timing signals, including the PWM interrupt signal PWM INT (curve 1402), the DMUX signal representing the occurrence of back-EMF zero crossings (curve 1404) and the INDEX signal (curve 1406) in the control system 100 of FIG. 3. The INDEX and DMUX signals include velocity and phase timing information. The control processor 102 uses the phase information of the INDEX interrupt to update the duty cycle command of the control output value ACO. In response to a new speed/phase estimate, the control processor 102 updates the control output value. In one implementation, represented by the relative timing of the interrupt signals in FIG. 14, the duty cycle set by the control output value ACO remains constant between speed and phase updates. The motor gate driver 332 in one example outputs the PWM timing signal PWM INT by setting up appropriate internal register. The inverter 104 in one example generates the back-EMF zero-crossing signal (DMUX) as an output pulse based on internal zero crossing detection circuitry (not shown) that monitors the voltage output signals of the inverter 104. In the example configuration of FIGS. 3 and 13, the PWM and DMUX timing signals from the motor gate driver 332 of the inverter 104 are connected to GPIO pins of the control processor 102, in order to provide interrupt signals to the microprocessor 130. The control system 100 advantageously uses the higher timing resolution of the PWM timing signal PWM INT compared with the INDEX signal 1406 (FIG. 14) to achieve a duty cycle amplitude resolution benefit by updating the duty cycle command in-between speed and phase estimator updates.

Figure 15:
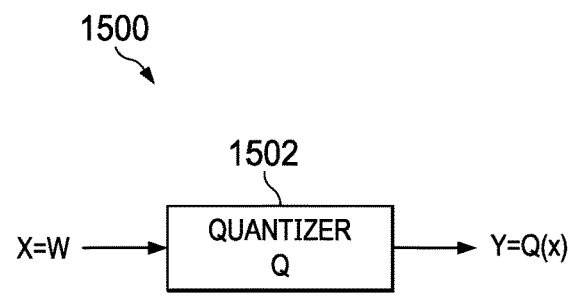
FIG. 15 is a simplified block diagram of an un-dithered quantizer system.
Figure 16:
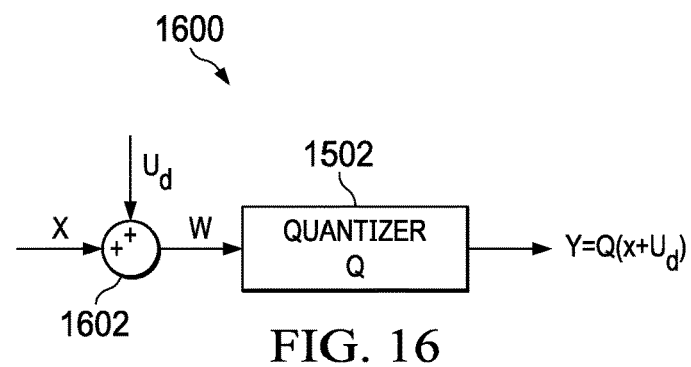
FIG. 16 is a simplified block diagram of a dithered quantizer system.
Figure 17:
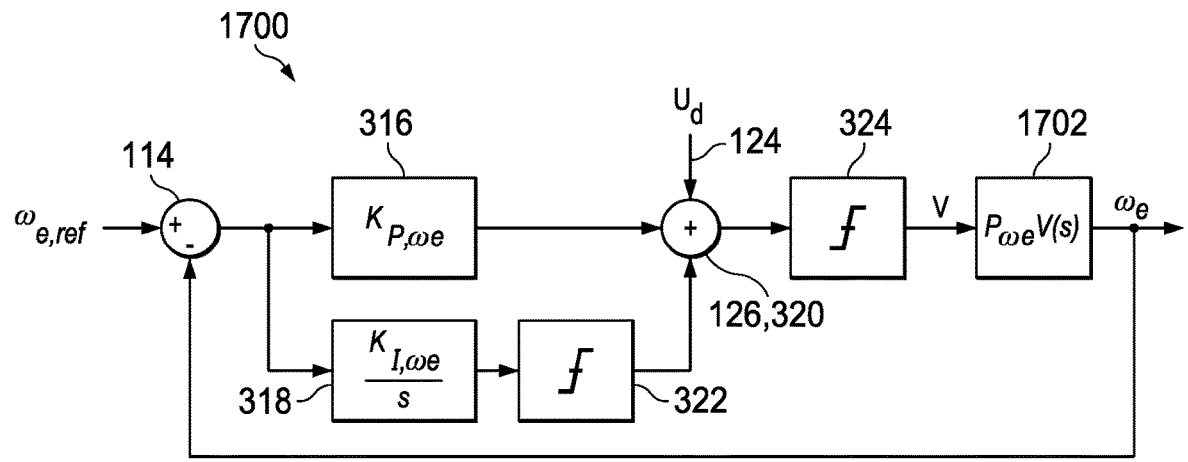
FIG. 17 is a simplified block diagram of a voltage control architecture with dithering.

Referring also to FIGS. 15-17, FIG. 15 shows an un-dithered quantizer system 1500 with a quantizer 1502 (quantizer Q) receiving an input signal x=w and providing a quantizer output signal y=Q(x). FIG. 16 shows a dithered quantizer system in which the input signal x is dithered by a dithering signal Ud using a summer 1602 to provide a signal w to the quantizer 1502. The quantizer 1502 in this example generates an output y=Q(x+Ud). FIG. 17 shows a voltage control architecture 1700 with dithering to control the velocity $\omega_e$ of a process or plant 1702. In described examples, dithering can use subtractive and non-subtractive dithering components 122, where the examples of FIGS. 1 and 3 use non-subtractive dithering. The dithering system in FIG. 16 achieves a modification in spectrum of the quantized signal by introducing the dithering signal before quantization. The illustrated dithering can use any suitable mechanisms to generate the dithering signal $U_d$, and the dithering can be combined with quantization noise shaping in some implementations.

The example of FIG. 17 uses dithering in an architecture where the system controls the plant velocity $\omega_e$ by an applied voltage V. The plant voltage to speed transfer function is represented by $P_{\omega_e}v(s)$. The applied voltage control signal V in this example is given by the following equation (3):

$$V = (K_{P,\omega_e} + (K_{I,\omega_e}/s))\Delta\omega_e + U_d \quad (3)$$

Equation (3) shows the addition of the dithering signal $U_d$ to the output of a PI controller in a voltage control architecture. The dithering technique can also be applied to a current control architecture, where the dithering signal is added to the current command as described by the following equation (4):

$$I = (K_{P,\omega_e} + (K_{I,\omega_e}/s))\Delta\omega_e + U_d \quad (4)$$

This technique is applicable to both PWM and linear current control architectures for enhancing the control resolution. The described dithering examples are useful in connection with trapezoidal drives and non-trapezoidal drives. For example, some examples employ dithering along with waveform shaping by including a waveform shaping component 121 as shown in FIG. 3. For example, this can be used for matching the waveform of the control output value ACO to the shape of the motor back-EMF. Unlike trapezoidal drive applications where the duty cycle pulse is applied to one half-bridge in each state (such as TI and T6 during state S0), the waveform shaping approach drives two half-bridges with a duty cycle command to create a desired non-trapezoidal waveform using rotor angle dependent functions $f_1(\theta_e)$ and $f_2(\theta_e)$ determine the waveform shape. In some examples, a dithering signal $U_d$ is applied on top of the waveform shaping. The following equations (5) and (6) show the application of dithering along with waveform shaping for voltage commands $V_1$ and $V_2$:

$$V_1 = Vf_1(k) + (\theta_e) + U_{d1} \quad (5)$$

$$V_2 = Vf_2(k) + (\theta_e) + U_{d2} \quad (6)$$

In one implementation, a voltage command is computed according to equation (3). The shaping contribution to the two duty cycle pulses are given by $Vf_1(\theta_e)$ and $Vf_2(\theta_e)$ where the functions $f_1(\theta_e)$ and $f_2(\theta_e)$ are suitable to generate a desired voltage waveform. The added dithering term contributes to increasing the effective number of duty cycle bits as described hereinabove. This implementation can be further simplified by combining waveform shaping and dithering as shown in the following equations (7) and (8):

$$V_1 = V[f_1(\theta_e) + (U_{d1}/V)] \quad (7)$$

$$V_2 = V[f_2(\theta_e) + (U_{d2}/V)] \quad (8)$$

In steady state, V is a constant and the sum of the shaping function $f$ and the dithering function $U_d$ of suitable distribution can be stored in a lookup table in the memory 132 of the control processor 102. The microprocessor 130 computes a desired voltage $V_d$ according to equations (3)-(8) and converts the desired voltage value $V_d$ to a duty cycle value according to the following equation (9), where $V_d = V$ for a trapezoidal drive and $V_d = V_1$ or $V_2$ for a non-trapezoidal drive:

$$V_{pu} = (V_d/V_{dc}) \quad (9)$$

Equations (10) and (11) show one example for updates using a dithering value:

$$V(nT_{idx} + kT_{pwm}) = K_{p,\omega_e}\Delta\omega_e(nT_{idx}) + s(nT_{idx}) + U_d(kT_{pwm}) \quad (10)$$

$$s(nT_{idx}) = s((n-1)T_{idx}) + K_{I,\omega_e}T_{idx}\Delta\omega_e(nT_{idx}) \quad (11)$$

Equations (10) and (11) demonstrate the two update rates of interest. These include an index rate at which the velocity error $\Delta\omega_e$ is updated, and the PWM rate at which the dithering term $U_d$ is updated.

Figure 18:
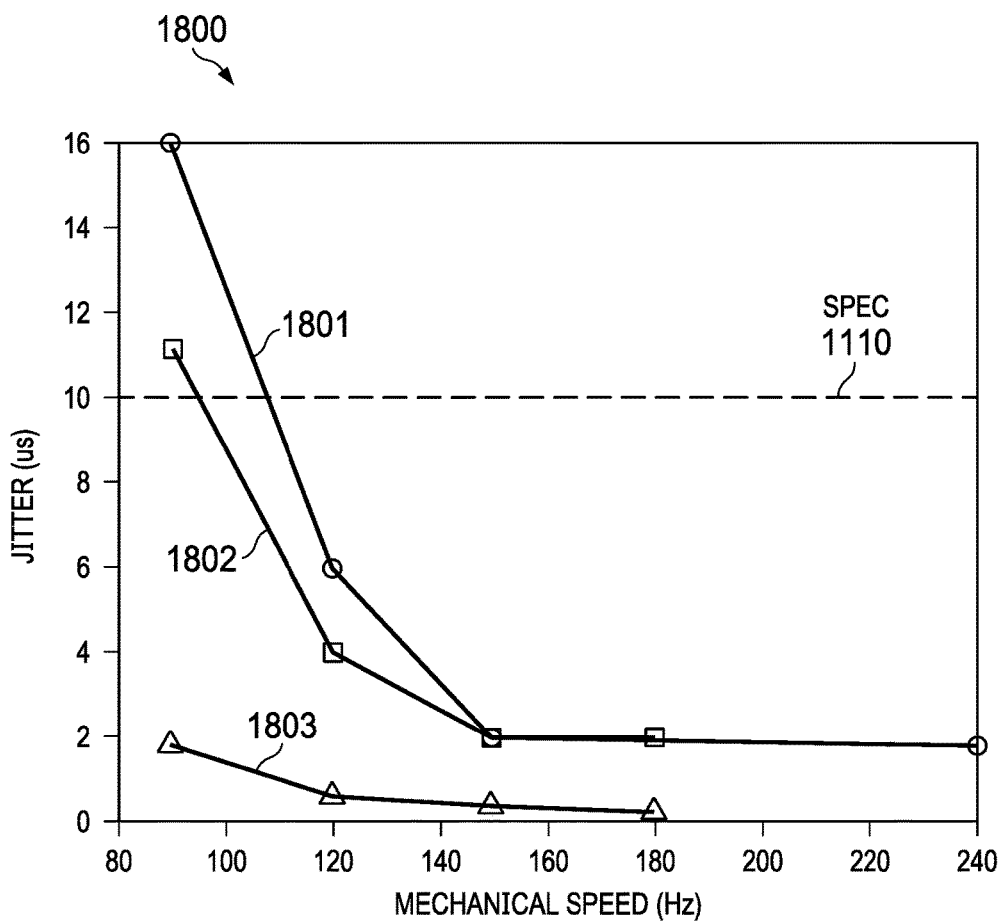
FIG. 18 is a graph of jitter performance versus mechanical speed.

FIG. 18 shows a graph 1800 of comparative simulated jitter performance versus mechanical speed in Hz for example implementations of the control system 100 in FIG. 3. The graph 1800 includes a first curve 1801 for the system without dithering. The curve 1801 shows significantly high jitter at low speeds, similar to the results in FIGS. 11 and 12 hereinabove. A second curve 1802 shows the improved (i.e., reduced) jitter performance using a first dithering method (Method 1) and curve 1803 illustrates further improvement using a second dithering method (Method 2). Any suitable dithering techniques (e.g., algorithms) and distributions can be used, such as uniform and Gaussian distributions DMUX and PWM rates. The example Methods 1 and 2 represented by the curves 1802 and 1803 correspond to uniform dithering distribution at the DMUX and PWM rates, respectively. These example results show that a uniform dithering distribution of $U_d$ at the PWM rate provides the best jitter performance improvement (curve 1803), and this example helps achieve the jitter specification 1110 (e.g., 5 μs) at 90 Hz. As shown in curves 1103 and 1104 of FIG. 11 hereinabove, 11-12 bits of PWM quantization would otherwise be needed to meet the jitter specification 1110 at 90 Hz. In this example, dithering provides an additional 2 to 3 bits of resolution, without requiring redesigned hardware. The improved resolution results in greater than 3× tracking performance improvement at higher frequencies i.e., 120 Hz and above. This performance improvement results in easier tuning and robustness at higher speeds where the baseline system performance is close to the jitter requirement.

The systems 100 and methods 200 help achieve several practical advantages, including improved low speed tracking performance without an elaborate hardware redesign, such as increasing CPU clock frequency, natural PWM generation, etc. which are alternative methods of improving resolution but require hardware redesign. Described examples also reduce hardware requirements. Some examples require no added CPU timers, and facilitate enhanced jitter performance in an existing DLP system or general position and/or velocity control system where the CPU timers are employed for Vsync and index time-stamping. Described examples include methods and systems suitable for high performance motor control by modifying the duty cycle output via dithering techniques, and improved solutions for improving tracking performance with existing hardware and software platforms. Example implementations are useful in combination with waveform shaping and duty cycle enhancement techniques for non-trapezoidal motors. Other example applications include improved duty cycle resolution for Field Oriented Control (FOC) and trapezoidal control of motors. Described examples can be employed in a wide variety of position and/or velocity control applications. Specific duty cycle control examples facilitate architecture and system partitioning for low-cost high performance phase-lock loop design in PWM based drives where the duty cycle is updated at a higher rate than position feedback sample rate. Also, described examples achieve ease of cost effective implementation through storage of dithering and waveform shaping values in a lookup table to minimize computation. Some examples further include updating voltage and current command to a three phase inverter based on past values of duty cycle quantization error. Example embodiments solve the problem of jitter in high performance motor drives, such as DLP color wheel drives arising out of PWM quantization and high frequency harmonic noise without increasing PWM frequency. Described examples update the duty cycle resolution of the inverter through algorithms at higher sampling frequency than the speed feedback rate, instead of through hardware redesign or the use of high resolution sensors. A dither signal modifies the phase lock loop control output to enable the use of existing control processor and driver ICs to drive a color wheel or other rotating structure without hardware redesign.

Modifications are possible in the described embodiments, and other embodiments are possible, within the scope of the claims.

What is claimed is:

1. A circuit to control a position and velocity of a machine, the circuit comprising:
an electronic memory; and
a processor configured to execute program instructions stored in the electronic memory to:
control the position according to a reference position pulse signal;
compute a parameter according to a velocity error value and a control function;
compute a control output value as a sum of the parameter and a dithering signal value, including by:
adjusting the parameter according to a machine position dependent waveform shaping function and a machine position feedback signal; and
computing the control output value as a sum of the adjusted parameter and the dithering signal value; and
control the position and velocity according to the control output value.

2. The circuit of claim 1, wherein the machine is a motor, and computing the control output value comprises:
computing a motor velocity setpoint value according to a rotor angle position feedback pulse signal and the reference position signal;
computing the velocity error value according to the motor velocity setpoint value and a motor velocity feedback value; and
adjusting the parameter according to the motor velocity error value and the control function.

3. The circuit of claim 1, wherein the machine is a motor, and controlling the position and velocity comprises:
generating an AC output signal according to a switching control signal to control the position and velocity; and
controlling a pulse width of the switching control signal according to the control output value.

4. A method of controlling a position and velocity of a machine, the method comprising:
controlling the position according to a reference position pulse signal;
computing a parameter according to a velocity error value and a control function;
computing a control output value as a sum of the parameter and a dithering signal value, including by:
adjusting the parameter according to a machine position dependent waveform shaping function and a machine position feedback signal; and
computing the control output value as a sum of the adjusted parameter and the dithering signal value; and
controlling the position and velocity according to the control output value.

5. The method of claim 4, wherein the machine is a motor, and computing the control output value comprises:
computing a motor velocity setpoint value according to a rotor angle position feedback pulse signal and the reference position signal;
computing the velocity error value according to the motor velocity setpoint value and a motor velocity feedback value; and
adjusting the parameter according to the motor velocity error value and the control function.

6. The method of claim 4, wherein the machine is a motor, and controlling the position and velocity comprises:
generating an AC output signal according to a switching control signal to control the position and velocity; and
controlling a pulse width of the switching control signal according to the control output value.

7. A light projection system comprising:
a color wheel;

a motor coupled to the color wheel;
an inverter coupled to the motor; and
control circuitry coupled to the inverter, the control circuitry comprising;
an electronic memory; and
a processor configured to execute program instructions stored in the electronic memory to:
control the position according to a reference position pulse signal;
compute a parameter according to a velocity error value and a control function;
compute a control output value as a sum of the parameter and a dithering signal value, including by:
adjusting the parameter according to a machine position dependent waveform shaping function and a machine position feedback signal; and
computing the control output value as a sum of the adjusted parameter and the dithering signal value; and
control the position and velocity according to the control output value.

8. The light projection system of claim 7, wherein computing the control output value comprises:
computing a motor velocity setpoint value according to a rotor angle position feedback pulse signal and the reference position signal;
computing the velocity error value according to the motor velocity setpoint value and a motor velocity feedback value; and
adjusting the parameter according to the motor velocity error value and the control function.

9. The light projection system of claim 7, wherein and controlling the position and velocity of the motor comprises:
generating an AC output signal according to a switching control signal to control the position and velocity; and
controlling a pulse width of the switching control signal according to the control output value.

10. The light projection system of claim 7, wherein the inverter includes:
a power stage to generate an AC output signal according to a switching control signal to control the position and/or velocity; and
a gate driver to control a pulse width of the switching control signal according to the control output value.

11. The light projection system of claim 7, wherein the control circuitry is configured to: implement an outer motor position control loop and an inner motor velocity control loop; and compute the parameter according to a motor velocity error value and a proportional-integral control function.

12. The light projection system of claim 11, wherein the control circuitry is configured to implement the outer motor position control loop to control the position according to a reference position signal.

13. A method of controlling a position and velocity of a color wheel, the method comprising:
controlling the position according to a reference position pulse signal;
computing a parameter according to a velocity error value and a control function;
computing a control output value as a sum of the parameter and a dithering signal value, including by:
adjusting the parameter according to a position of the color wheel dependent waveform shaping function and a color wheel position feedback signal; and
computing the control output value as a sum of the adjusted parameter and the dithering signal value; and
controlling the position and velocity according to the control output value.

14. The method of claim 13, wherein the color wheel includes a motor, and computing the control output value comprises:
computing a motor velocity setpoint value according to a rotor angle position feedback pulse signal and the reference position signal;
computing the velocity error value according to the motor velocity setpoint value and a motor velocity feedback value; and
adjusting the parameter according to the motor velocity error value and the control function.

15. The method of claim 13, wherein the color wheel includes a motor, and controlling the position and velocity comprises:
generating an AC output signal according to a switching control signal to control the position and velocity; and
controlling a pulse width of the switching control signal according to the control output value.

16. A light projection system comprising:
a color wheel;
a motor coupled to the color wheel; and
control circuitry coupled to the inverter, the control circuitry comprising;
an electronic memory; and
a processor configured to execute program instructions stored in the electronic memory to:
control the position according to a reference position pulse signal;
compute a parameter according to a velocity error value and a control function;
compute a control output value as a sum of the parameter and a dithering signal value, including by:
adjusting the parameter according to a machine position dependent waveform shaping function and a machine position feedback signal; and
computing the control output value as a sum of the adjusted parameter and the dithering signal value; and
control the position and velocity according to the control output value.

17. The light projection system of claim 16, wherein computing the control output value comprises:
computing a motor velocity setpoint value according to a rotor angle position feedback pulse signal and the reference position signal;
computing the velocity error value according to the motor velocity setpoint value and a motor velocity feedback value; and
adjusting the parameter according to the motor velocity error value and the control function.

18. The light projection system of claim 16, wherein and controlling the position and velocity of the motor comprises:
generating an AC output signal according to a switching control signal to control the position and velocity; and
controlling a pulse width of the switching control signal according to the control output value.

* * * * *